(12) United States Patent
Vincenti (10) Patent No.: US 7,712,787 B2
(45) Date of Patent: May 11, 2010

(54) CONNECTING DEVICE AND PROCESS FOR THE MANUFACTURE OF DUCTS FOR HEATING, CONDITIONING, AND VENTILATION

(75) Inventor: Giovanni Vincenti, Monza (IT)

(73) Assignee: Kingspan Holdings (IRL) Limited, Kingscourt (IE)

( * ) Notice: Subject to any disclaimer, the term of this patent is extended or adjusted under 35 U.S.C. 154(b) by 631 days.

(21) Appl. No.: 11/257,662

(22) Filed: Oct. 25, 2005

(65) Prior Publication Data

US 2007/0090647 A1    Apr. 26, 2007

(30) Foreign Application Priority Data

Nov. 5, 2004    (IT)    .......................... MI2004A2118

(51) Int. Cl.
*F16L 11/12*    (2006.01)
(52) U.S. Cl. .......................... 285/47; 285/257; 403/292; 403/294
(58) Field of Classification Search ................. 285/257, 285/424, 47, 48, 55; 411/921; 403/294, 403/295, 286; 52/596–597; 138/155, 157, 138/158, 159
See application file for complete search history.

(56) References Cited

U.S. PATENT DOCUMENTS

| | | | | | |
|---|---|---|---|---|---|
| 343,340 | A | * | 6/1886 | Remus | 229/198.1 |
| 2,183,174 | A | * | 12/1939 | Smith | 138/39 |
| 2,206,918 | A | * | 7/1940 | Powell | 206/170 |
| 2,389,468 | A | * | 11/1945 | Terry | 138/158 |
| 2,396,030 | A | * | 3/1946 | Terry | 285/405 |
| 2,877,520 | A | * | 3/1959 | Jureit | 403/283 |
| 2,916,054 | A | * | 12/1959 | Callan | 285/55 |
| 3,251,382 | A | * | 5/1966 | Tatsch | 138/151 |
| 3,712,649 | A | * | 1/1973 | Martin | 285/397 |
| 4,641,474 | A | * | 2/1987 | Cannarsa | 52/514 |
| 5,414,991 | A | * | 5/1995 | Kfir et al. | 59/77 |
| 6,364,374 | B1 | * | 4/2002 | Noone et al. | 285/424 |

* cited by examiner

Primary Examiner—Michael P. Ferguson
Assistant Examiner—Jay R Ripley
(74) Attorney, Agent, or Firm—Pearne & Gordon LLP (57) ABSTRACT

It is disclosed a connecting device for the manufacture of ducts for heating, conditioning, ventilation comprising a plate-like element (2) which is provided, on a face (2a) thereof at opposite positions, with at least two hooking points (3) adapted to penetrate contiguous portions to be joined of a duct (4) segment or of two consecutive duct segments. Also provided is a connecting process comprising a step of applying at least one connecting device (19 on either side of a junction line (4a) defined by two opposite longitudinal bands of a panel (5) adapted to form a duct (4) segment.

5 Claims, 7 Drawing Sheets

CONNECTING DEVICE AND PROCESS FOR THE MANUFACTURE OF DUCTS FOR HEATING, CONDITIONING, AND VENTILATION

FIELD AND BACKGROUND OF THE INVENTION

The present invention relates to a connecting device and process for the manufacture of ducts for heating, conditioning, ventilation and similar applications.

It is known that a great number of types of conditioning/heating ducts are present on the market which differentiate from each other in terms of manufacturing methods, materials, sizes and assembling and hooking systems. Among these types there is one contemplating manufacture of ducts of suitable section starting from flat sandwich panels consisting of a core of insulating material interposed between two thin metal sheets.

Manufacture of ducts for the above mentioned applications is carried out following a sequence of operating steps comprising a starting step of suitably arranging the panels of insulating material cut to size to form the different segments of the expected ducts.

In particular, in the case of straight ducts of a rectangular section and consisting of a single panel, two bevels inclined at an angle of 45° are first of all formed at longitudinal and opposite edge bands of the same panel, which bevels are designed to form a junction line of the duct segment defining one of the longitudinal edges of the duct itself. In addition, formed within the panel are three V-shaped notches with a 90° opening and adapted to define longitudinal bending lines.

In accordance with the known art, the above mentioned 45° bevels and V-shaped notches are provided to be fully and uniformly covered with a layer of glue by a brush spreader or a spray gun, for example, after setting them free of any residual material resulting from cutting operations.

Before carrying out bending of the panel along the V-shaped notches to shape the segment into a duct it is necessary to wait for about 15 minutes to enable the glue solvent to evaporate. This period of time varies depending on the temperature and humidity and can become much longer under particular unfavorable weather conditions. Practically, the gluing operation terminates when the glue is dry to the touch and is to be carried out in a very ventilated area and in compliance with all measures provided by the regulations in force concerning environmental sanitation and safety.

The connecting process briefly described above for the manufacture of ducts for heating, conditioning, ventilation through use of glue has many limits and drawbacks.

In fact, first of all, it contemplates a stop in the duct building process for a period of time that is sometimes rather long and often cannot be exactly foreseen, due to the fact the glue drying time is not always the same.

In addition, the special glues used to obtain a steady and safe union of the duct sides are very expensive and therefore greatly affect the overall costs for manufacturing said ducts.

Finally, it is to be pointed out that the operations for glue application and assembling of the glue-coated parts are characterized by a non negligible complexity of execution and all expedients, measures and safety precautions prescribed by the regulations in force are required to be complied with because the glue may contain inflammable or toxic components.

SUMMARY OF THE INVENTION

Under this situation, the technical task underlying the present invention is to conceive a connecting device and process for the manufacture of ducts which is able to substantially obviate the mentioned drawbacks.

Within the scope of this technical task it is an important aim of the invention to conceive a connecting device and process for manufacturing ducts that is capable of greatly reducing the operating time required while making it exactly foreseeable, which will bring about a reduction in the costs connected with manpower.

Another important aim of the invention is to conceive a connecting device of reduced cost so that, as a result, the overall costs of the materials used in manufacturing said ducts will be ultimately reduced.

A still further aim is to conceive a connecting device and process simplifying and making easier the operating steps for manufacturing said ducts while avoiding creation of noxious and dangerous environmental situations.

The technical task mentioned and the aims specified are substantially achieved by a connecting device and process that are characterized in that they comprise one or more of the technical solutions claimed in the appended claims.

BRIEF DESCRIPTION OF THE DRAWINGS

Description of a preferred but not exclusive embodiment of a connecting device in accordance with the invention is given hereinafter by way of non-limiting example, with the aid of the accompanying drawings, in which.

DESCRIPTION OF THE PREFERRED EMBODIMENTS

With reference to the drawings, the connecting device in accordance with the invention has been generally identified by reference numeral 1.

Figure 1:
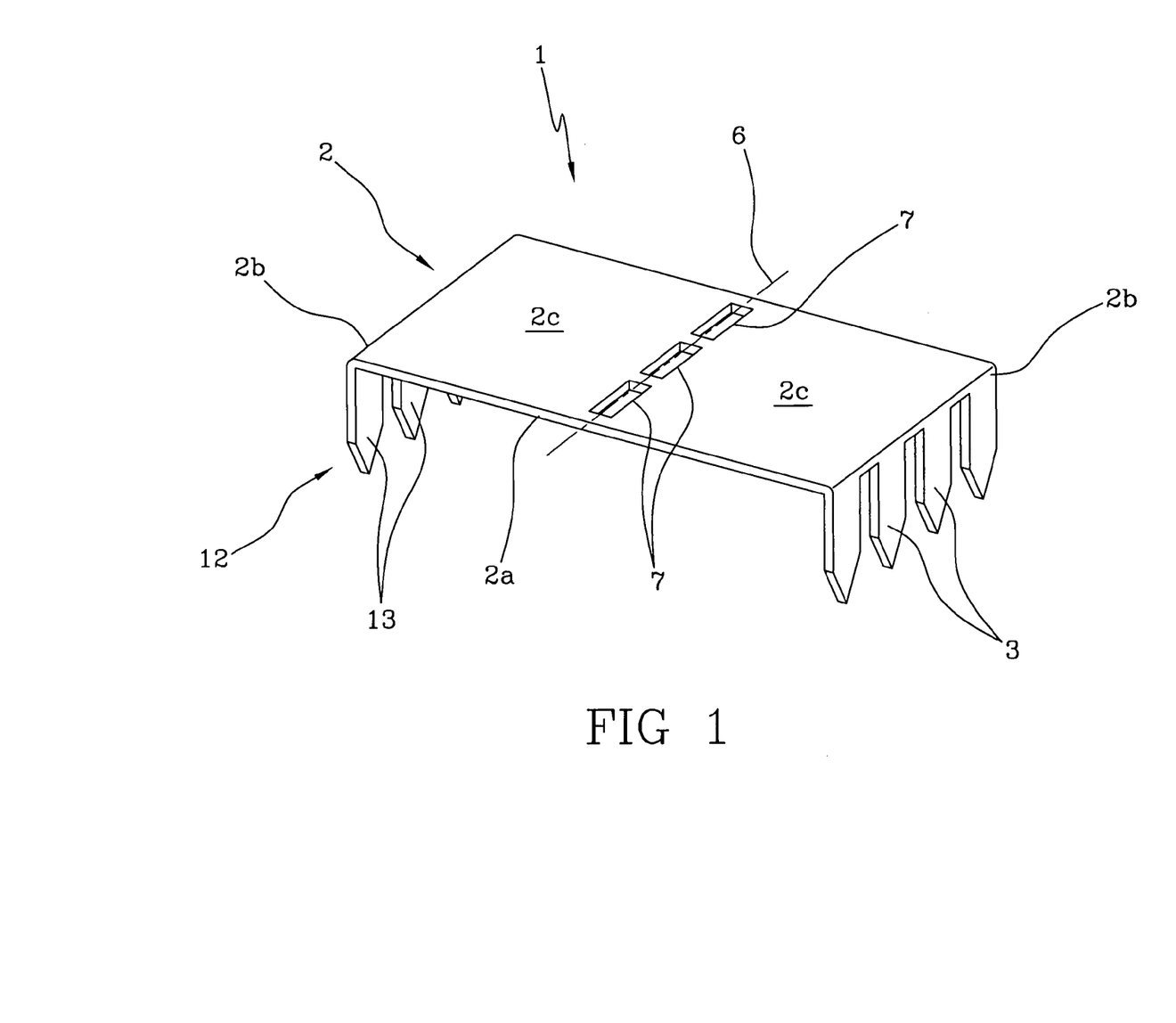
FIG. 1 is a perspective view of a connecting device in accordance with the invention.
Figure 6:
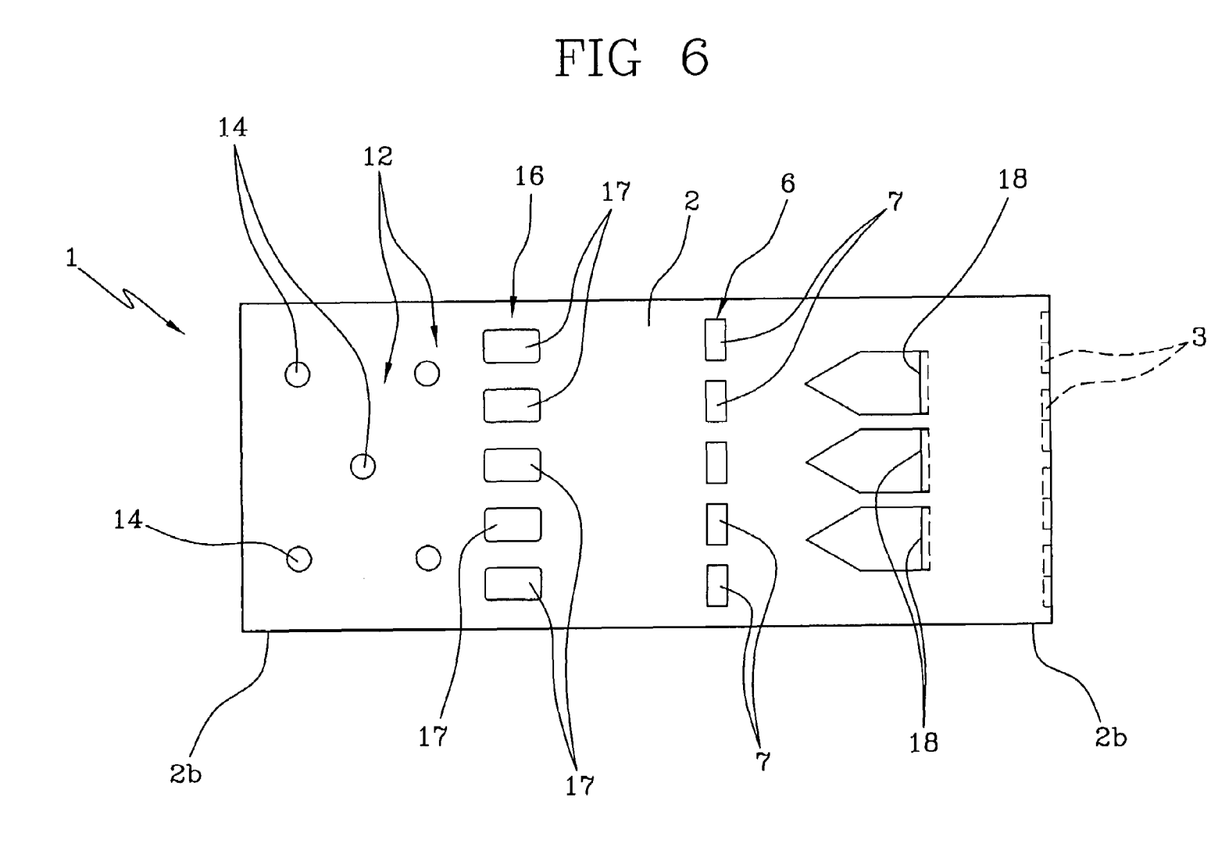
FIG. 6 shows an alternative embodiment of the connecting device in accordance with the invention.

As can be seen from FIGS. 1 and 6 the connecting device, substantially consisting of a plate-like element of a rectangular shape in plan view, is provided, at one end 2b, with at least one hooking point 3, four points emerging from a lower face 2a thereof, for example.

On the contrary, at the opposite short side 2b engagement means 12 is present which too is associated with the same plate-like element 2, for engagement with a contiguous portion of a duct segment or with an accessory 15 of the duct itself.

Looking now at FIGS. 1 to 5, the device, in its first embodiment, comprises a plate-like element 2 having at least two hooking points 3, 13 on a face 2a thereof, four hooking points for each of the opposite edges 2b of the same plate-like element 2, for example. The hooking points 3 and 13 project from face 2a in a direction substantially perpendicular and have a tooth-shaped conformation adapted to penetrate contiguous portions to be joined of a single duct segment 4 (as in the example in FIG. 3) or of two consecutive duct segments 4 (as in the example in FIG. 5) for example, advantageously formed from panels 5 consisting of an insulating material 10 sandwiched between two preferably metallic thin sheets 11. In one embodiment, use of an insulating material 10 consisting of phenolic foam coated with aluminum on both sides is provided.

Figure 3:
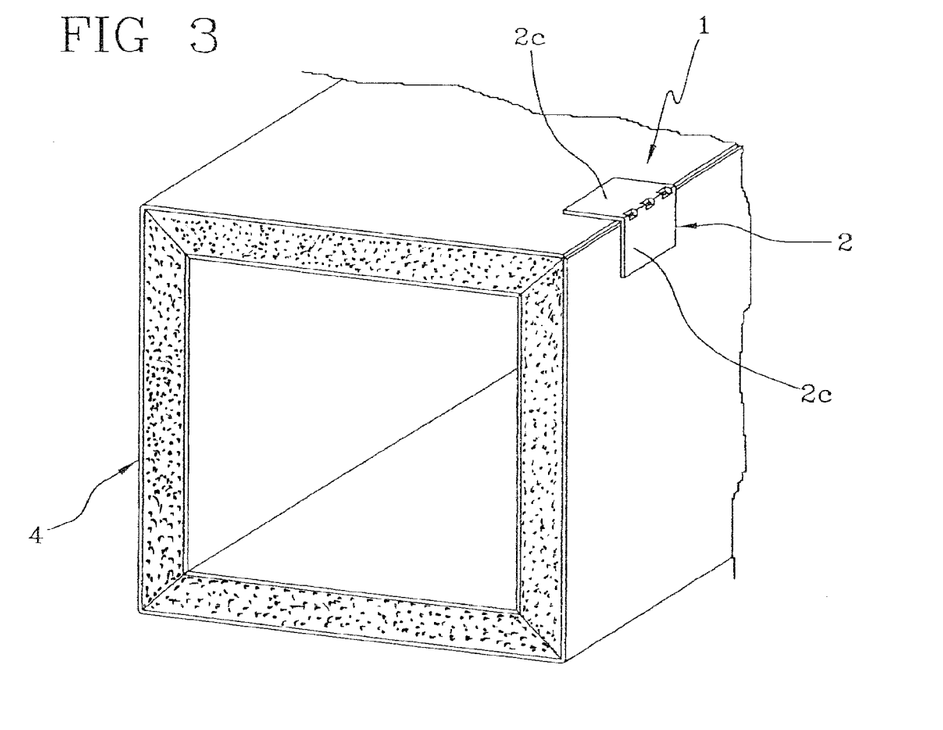
FIG. 3. is a fragmentary perspective view of a duct segment obtained with the device in FIG. 1.
Figure 4:
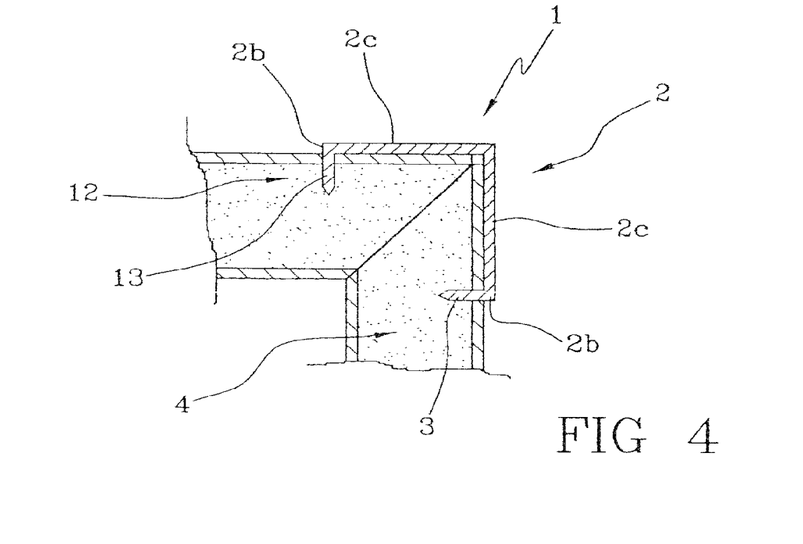
FIG. 4 is a fragmentary cross section to an enlarged scale of the segment shown in FIG. 3 taken along line IV-IV.

The plate-like element 2 further has a weakening region or strip 6 interposed between the hooking points 3, 13 and adapted to define a bending line so as to enable the plate-like element itself to be divided into two angled flat halves 2c (see FIGS. 3 and 4).

The weakening strip 6 is for example formed with a plurality of through slits 7 mutually aligned in a longitudinal direction.

Preferably the plate-like element 2 and hooking points 3, 13 are obtained from a single element of metal material for example, suitably cut out and bent.

The invention also puts into practice a new connecting process based on use of the above described device to be utilized in manufacturing ducts for heating, conditioning, ventilation.

Said manufacture, where a straight duct segment 4 of rectangular section consisting of a single panel 5 is to be built, comprises several different operating steps among which, first of all, arrangement of the panel to the intended sizes. As already said beforehand, said panel may advantageously consist of a phenolic or polyurethane foam coated with aluminum sheets on both sides.

Figure 2:
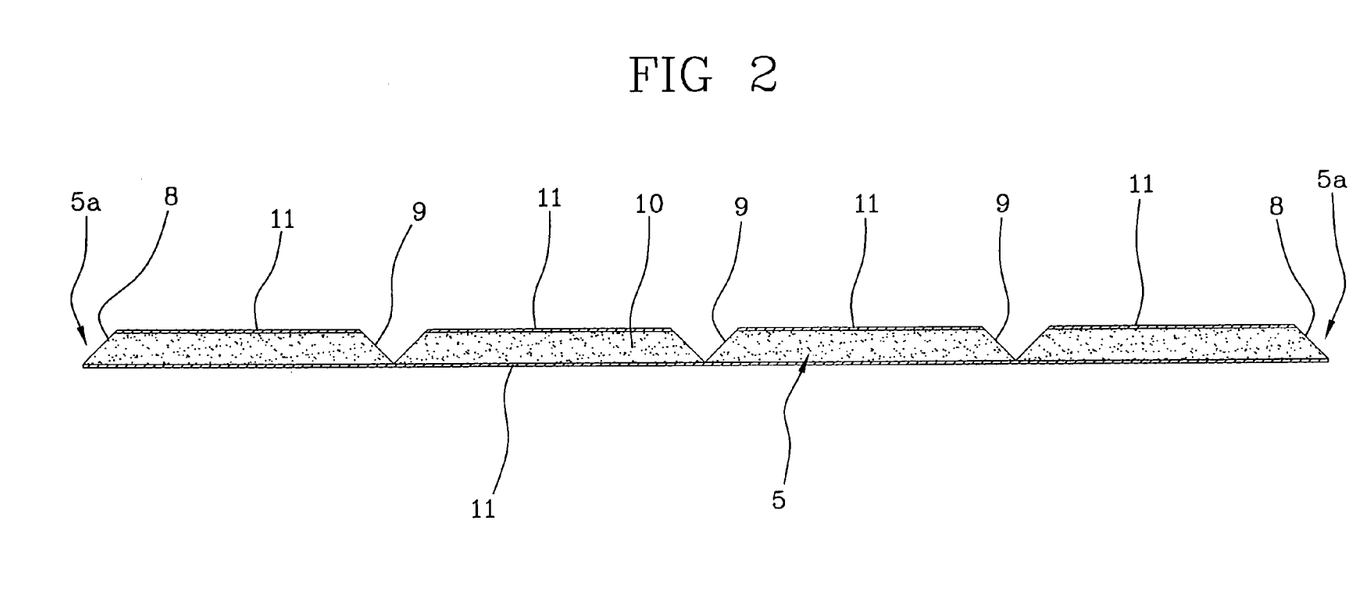
FIG. 2 shows a cross section of a panel before the bending operation.

In a subsequent operating step, at longitudinal and opposite edge bands 5a of the panel, two bevels 8 generally at an angle of 45° are formed which are designed to constitute the junction line 4a of the duct segment 4 defining a longitudinal edge of same.

Further formed internally of panel 5 are three V-shaped notches 9 with a substantially 90° opening which are designed to define longitudinal bending lines of the duct segment 4.

In an original manner, in the process in accordance with the invention bending along the V-shaped notches 9 necessary to shape the duct segment 4 is not preceded by any gluing step, but is exclusively followed by application on either side of the junction line 4a of one or more connecting devices 1 the hooking points 3, 13 of which penetrate the respective edge bands 5a after the plate-like element 2 has been bent along the weakening line 6 so as to form the two flat halves 2c.

Figure 5:
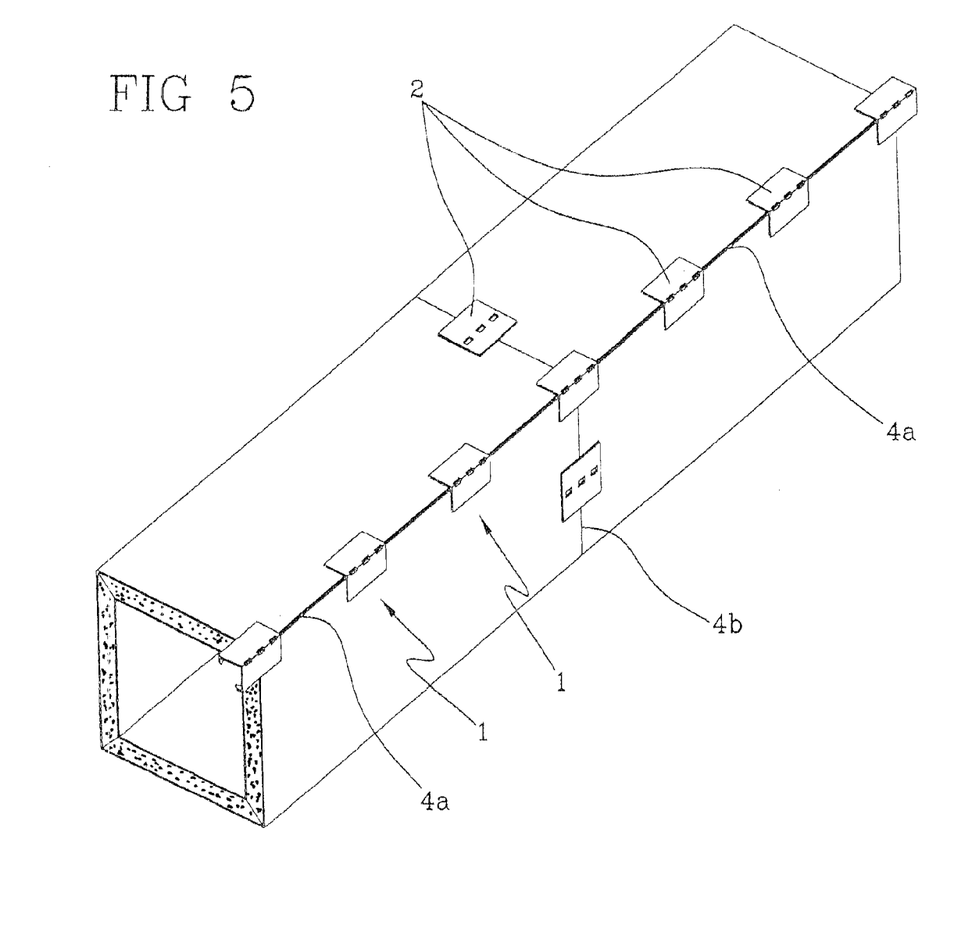
FIG. 5 is a perspective view of two consecutive duct segments joined by the device in FIG. 1.

Use of the connecting devices 1 in accordance with the invention also enables a connecting process to be put into practice which carries out junction between the ends of consecutive separated segments of the same duct (not shown in the figure) and also to longitudinally join consecutive ducts 4 along the junction line 4b (see FIG. 5).

In the last-mentioned process application of at least four devices 1 is provided, one for each duct side, astride the contacting ends 4b of two consecutive duct segments 4. The devices 1 can be maintained flat if they are disposed centrally on the sides of the duct segments 4 or they are to be bent along the weakening line 6 if applied to the edges. In both cases the hooking points 3 and 13 penetrate end bands of these duct segments that are contiguous to said contacting ends 4b.

Vice versa, looking at the second embodiment shown in FIGS. 6 to 9, it is possible to see that the plate-like element 2 in addition to having the already mentioned hooking points 3 is provided at one end thereof, at the opposite side 2b, with a predetermined number of holes 14 for fastening of a duct accessory 15 such as a fan coil (FIG. 9) or an air lock (FIG. 8), by means of screws, rivets or similar junction devices for example.

Figure 7A:
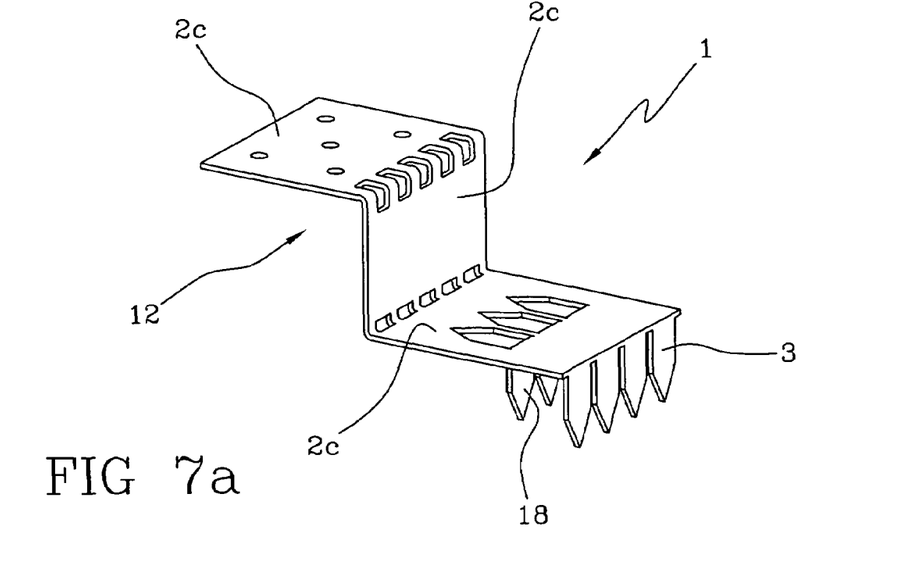
FIGS. 7a and 7b show the device seen in FIG. 6 in two different operating variants.
Figure 7B:
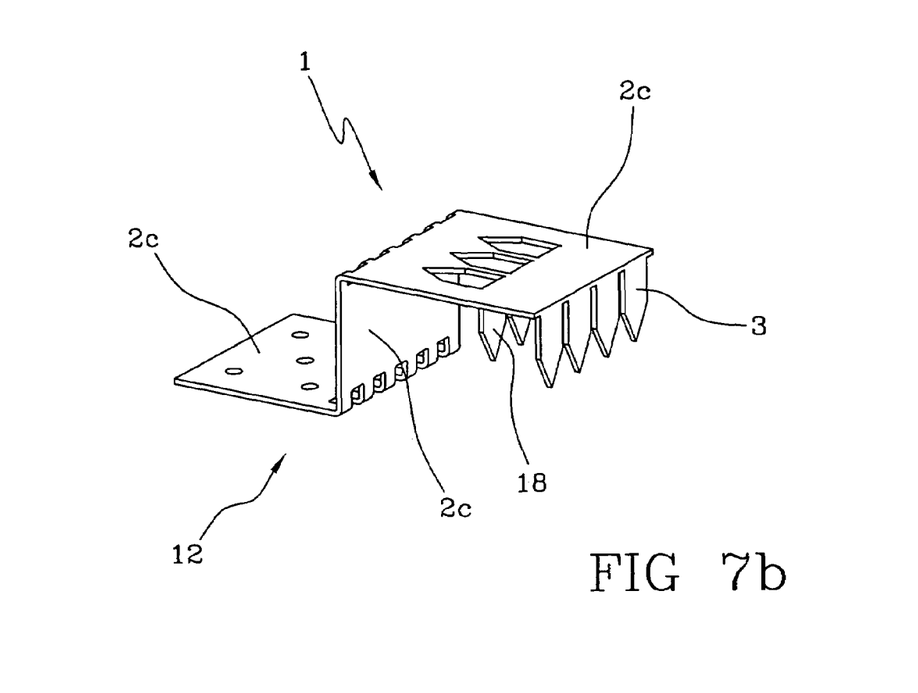

In particular, the plate-like element will not only be provided with the weakening strip 6 formed with the respective slits 7, but also with a second weakening strip 16 adapted to define a second bending line of the plate-like element itself to enable the latter to be divided into three angled flat portions 2c (in this connection see FIGS. 7a and 7b).

The second weakening strip 16 too is made up of a plurality of through slits 17 possibly of a shape and configuration different from the preceding ones, which are however mutually aligned.

Still looking at the plate-like element 2 in FIG. 6 it is possible to notice the presence of a further row of hooking points 18 positioned at the first flat half 2c from which also the other hooking points 3 emerge.

This connecting element can be bent following different angles along the bending lines and as shown in FIGS. 7a and 7b.

Figure 9:
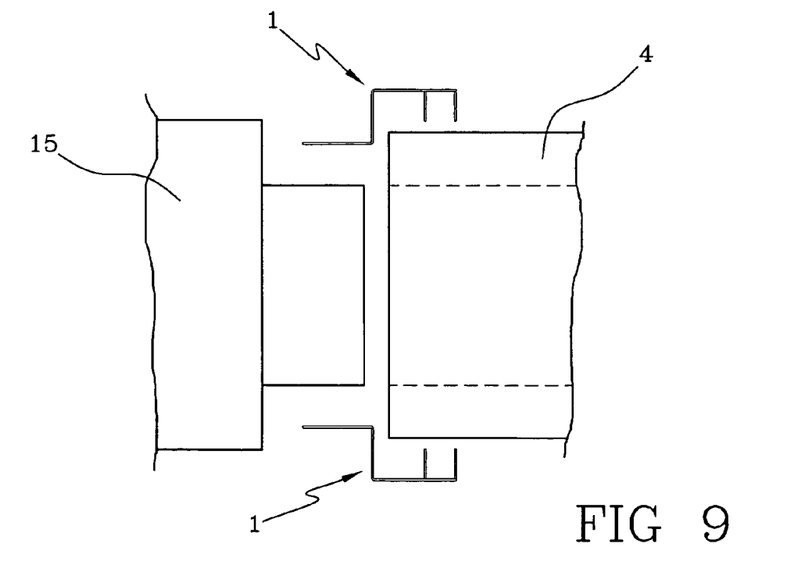

It will be also recognized that both these bending lines can be utilized as shown in FIG. 9 to define engagement of a pre-insulated duct of the previously described type with a fan coil, by in particular inserting the hooking points 3 and 18 into the end walls of the pre-insulated duct and then securing the holes 14 of the plate-like element to corresponding junction elements present in the fan coil, by means of screws, bolts or the like.

Figure 8:
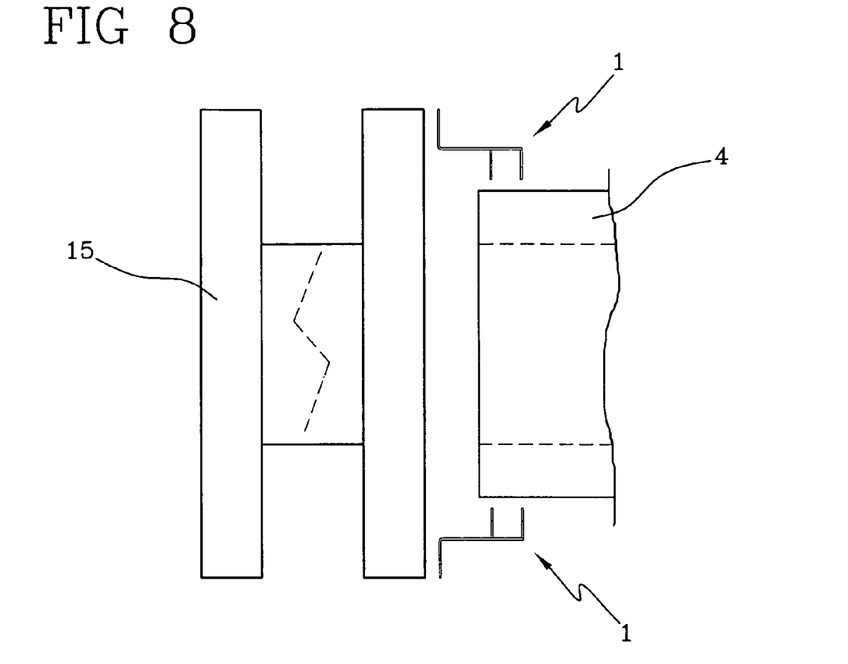
FIGS. 8 and 9 show two possible applications of the device seen in FIG. 6.

Vice versa the same connecting element can be used to join the end portion of a pre-insulated duct always of the previously described type to an air lock by only utilizing one bending along the second weakening strip 16.

In this way and as shown in FIG. 8, the connecting device will have the hooking points 3 and 18 inserted in an end portion of the pre-insulated duct and vice versa the engagement means consisting of holes 14 oriented on a flat half 2c at 90° relative to the other half carrying the hooking points.

The invention achieves important advantages.

In fact, first of all, the connecting device and process in accordance with the invention enables duct segments to be easily and quickly obtained and/or consecutive duct segments already made to be joined without use of glue, so that the drawback intrinsic to a massive use of the latter is eliminated.

It will be also recognized that the connecting device and process in accordance with the invention greatly reduce the times and costs for assembling the ducts because they lend themselves to be introduced into automated manufacturing procedures.

Finally, by use of the inventive device, the junction of the edge bands 5a that in accordance with the known are held together by glue, are made sturdier by means of a mechanical element.

What is claimed is:

1. A connecting device in combination with two ends of insulated duct for heating, ventilation or air conditioning, said device comprising a monolithic element having a longitudinal axis and a transverse axis, the element comprising a first engagement section, a second engagement section and an intermediate section between the first and second engagement sections, the first and second engagement sections being spaced-apart along the longitudinal axis, the first engagement section comprising a plurality of first integral engagement projections, the second engagement section comprising a plurality of second integral engagement projections, the intermediate section having a generally transversely extending bending axis about which a portion of the element is bendable, the intermediate section having a plurality of apertures which are spaced-apart along the transverse bending axis, each aperture having a longitudinal axis, each aperture longitudinal axis being aligned with said bending axis, the insulated duct having a structure in section comprising a layer of insulating material sandwiched between an outer metal sheet and an inner metal sheet, the two ends of insulated duct being a first end and a second end, the first projections extending into the first end, the second projections extending into the second end so that the device connects the two ends of insulated duct together, the two ends of insulated duct coming together to form an angle, the device being bent along the bending axis to conform to said angle, each projection being a tooth, each tooth having a thickness extending longitudinally with respect to the device and a width extending transversely with respect to the device, each tooth width being substantially greater than each tooth thickness, each tooth extending, with respect to duct, through the outer metal sheet and into the layer of insulating material but not into the inner metal sheet, wherein said plurality of first integral engagement projections extend from a first end of the element and are bent over to provide a first row of teeth, and wherein said plurality of second integral engagement projections extend from a second end of the element and are bent over to provide a second row of teeth.

2. The connecting device in combination with the insulated duct as claimed in claim 1, wherein the bending axis is located approximately in the middle of the intermediate section.

3. The connecting device in combination with the insulated duct as claimed in claim 1, wherein the element is of metal.

4. The connecting device in combination with the insulated duct as claimed in claim 1, wherein each tooth is pointed.

5. The connecting device in combination with the insulated duct as claimed in claim 1, wherein the insulating material is phenolic foam.

* * * * *